United States Patent
Weiland

(10) Patent No.: US 7,281,743 B2
(45) Date of Patent: Oct. 16, 2007

(54) HEIGHT-ADJUSTABLE LOADING BASE FOR A MOTOR VEHICLE

(75) Inventor: Alexander Weiland, Unterhaching (DE)

(73) Assignee: DaimlerChrysler AG, Stuttgart (DE)

( * ) Notice: Subject to any disclaimer, the term of this patent is extended or adjusted under 35 U.S.C. 154(b) by 176 days.

(21) Appl. No.: 10/517,650

(22) PCT Filed: Jun. 10, 2003

(86) PCT No.: PCT/EP03/06045

§ 371 (c)(1),
(2), (4) Date: Jun. 29, 2005

(87) PCT Pub. No.: WO03/104035

PCT Pub. Date: Dec. 18, 2003

(65) Prior Publication Data

US 2005/0244258 A1    Nov. 3, 2005

(30) Foreign Application Priority Data

Jun. 11, 2002  (DE) ............................... 102 25 889

(51) Int. Cl.
*B60R 7/00* (2006.01)
(52) U.S. Cl. ............................. 296/24.44; 296/24.45; 414/466
(58) Field of Classification Search ............. 296/26.11, 296/37.1, 37.16, 24.44, 24.45; 414/466, 414/462; 108/44
See application file for complete search history.

(56) References Cited

U.S. PATENT DOCUMENTS

| | | | |
|---|---|---|---|
| 2,473,035 A | 6/1949 | Meade et al. | |
| 2,492,841 A * | 12/1949 | Burkey | 414/462 |
| 2,953,287 A | 9/1960 | Werner | |
| 3,406,999 A | 10/1968 | Kozicki | |
| 3,627,158 A | 12/1971 | Kobasic | |
| 4,671,729 A * | 6/1987 | McFarland | 414/462 |
| 4,969,793 A | 11/1990 | Pawl | |
| 5,301,992 A * | 4/1994 | Whitmore | 296/37.1 |
| 5,951,232 A * | 9/1999 | Yu et al. | 414/463 |
| 6,050,202 A | 4/2000 | Thompson | |
| 6,145,447 A * | 11/2000 | Henderson | 108/44 |
| 6,290,277 B1 | 9/2001 | Spykerman et al. | |

FOREIGN PATENT DOCUMENTS

DE     39 23 690 A1    1/1991

(Continued)

OTHER PUBLICATIONS

International Search Report.
Japanese office action dated Feb. 1, 2007 with English translation of the relevant portion (Five (5) pages).

(Continued)

*Primary Examiner*—Dennis H. Pedder
(74) *Attorney, Agent, or Firm*—Crowell & Moring LLP

(57) ABSTRACT

The invention proposes a device (1) for guiding a loading floor (3), the height of which can be adjusted manually and which can be pivoted about a first spindle (9), of a motor vehicle. The device (1) is distinguished by lever parts (7), which are arranged opposite one another, can be pivoted about a second spindle (11) and on which the loading floor (3) is pivotably mounted, wherein the loading floor (3) can be adjusted between a lower loading floor position and an upper loading floor position by a pivoting movement of the lever parts (7).

13 Claims, 2 Drawing Sheets

FOREIGN PATENT DOCUMENTS

| | | |
|---|---|---|
| DE | 197 31 324 A1 | 3/1999 |
| DE | 197 37 712 A1 | 3/1999 |
| DE | 199 06 648 A1 | 8/2000 |
| JP | 51-160811 | 12/1976 |
| JP | 62-194149 U | 12/1987 |
| JP | 2-106945 U | 8/1990 |
| JP | 2000-159025 A | 6/2000 |
| JP | 2000-177491 A | 6/2000 |
| JP | 2003-146142 A | 5/2003 |
| WO | WO 01/40023 A2 | 6/2001 |

OTHER PUBLICATIONS

European Patent Office Action, 1 page, May 18, 2007.

Notice of Opposition to a European Patent (Opponent—Carcoustic Italia S.p.A.) Apr. 30, 2007.

Notice of Opposition to a European Patent (Opponent—San Valeriano SpA) Apr. 27, 2007.

Notice of Opposition to a European Patent (Opponent—Carcoustic Italia S.p.A.) May 8, 2007.

* cited by examiner

HEIGHT-ADJUSTABLE LOADING BASE FOR A MOTOR VEHICLE

BACKGROUND AND SUMMARY OF THE INVENTION

The invention relates to a device for guiding a loading floor of a motor vehicle, the height of which floor can be adjusted manually.

Devices of the type under discussion here are known (DE 199 06 648 A1). The device is used to guide a loading floor provided in the luggage compartment of a motor vehicle and comprises two identical guide rails which are spaced apart from one another and in which the loading floor is slidably mounted. The guide rails each have a rail section which runs obliquely with respect to an imaginary horizontal and the end of which is adjoined by a second rail section running approximately parallel to the horizontal. On account of this configuration of the guide rails, the loading floor can be adjusted into a lower position and into a higher, upper position, in order, for example with the seat arrangement folded down, to create a level compensation (i.e. a flat loading surface) comprising a loading floor and the rear side of the seat backrest. It has been found that the loading floor often tends to become tilted or wedged in the guide rails. To avoid this, the operator has to accurately guide the loading floor during adjustment, needing both hands to do so.

It is an object of the present invention to provide a device of the type described in the introduction which allows simple and functionally reliable operation of the loading floor with one hand. This device should preferably be of a simple and inexpensive structure.

To achieve the object, the invention proposes a device that is distinguished by lever parts which are arranged opposite one another and can be pivoted about a second spindle and on which the loading floor is pivotably mounted. The lever parts are designed and pivotably mounted in such a manner that, as a result of a pivoting movement of the lever parts about the second spindle the loading floor can be adjusted between a lower loading floor position and an upper loading floor position. The loading floor whose height can be adjusted manually therefore executes a partial circular motion about the second spindle when it is pivoted. On account of this configuration of the device, the loading floor is guided in a simple and accurate way, preferably without any lateral play, so that a uniform movement of the loading floor is readily achievable. This provides an operator with the option of adjusting the height of the loading floor using just one hand. The device is distinguished by a high operational reliability, high comfort of operation and a simple structure. The supporting of the loading floor by the pivotable lever parts also has the advantage that in the event of a crash the energy produced are absorbed by the bearing arrangement, and consequently the loading floor does not endanger any passengers sitting in the back seats.

The pivotability of the loading floor about the first spindle allows the loading floor to be folded/moved upward during the height adjustment, so that the operator can individually determine the position of inclination to which he would like to adjust the loading floor.

In one particularly advantageous embodiment of the device, the loading floor forms the floor surface of the luggage compartment of the motor vehicle and can be pivoted about the first spindle in both the lower loading floor position and the upper loading floor position. One advantage of this embodiment is that this makes the space below the loading floor accessible. This means that when the loading floor is arranged in the upper position objects can be stored therein. Furthermore, even when the loading floor is arranged in the lower position, it is still possible to gain access to the area located beneath it, in which, for example, a spare wheel, tools or other equipment for the motor vehicle are stored.

In a particularly preferred embodiment of the device, the loading floor is supported on one side. In other words, the lever parts, during the adjustment operation, are the only locations supporting the loading floor, which is therefore supported only on the motor vehicle bodyshell. The result of this is that the height of the loading floor can be adjusted independently of, for example, the position of the backrest of the bank of rear seats, which can preferably be folded down.

In another preferred embodiment, the first and second spindles, which are arranged at a distance from one another, run parallel to one another and transversely or substantially transversely with respect to the vehicle longitudinal axis, thereby ensuring good handling properties of the loading floor.

Furthermore, a yet another preferred exemplary embodiment of the device is distinguished by the fact that in the upper loading floor position the first spindle is arranged above the second spindle, as seen in the direction of the force of gravity, specifically in such a manner that the resulting forces which are transmitted via the loading floor to the lever parts are oriented substantially in the direction of the bearing center of the lever parts. The result of this is that the lever parts, in the upper loading floor position, are not subject to torque from the weight of the loading floor itself and any loads placed on it. Therefore, the forces of the weight are completely or substantially completely introduced into the bearing arrangement of the lever parts.

According to a further development of the invention, in the lower loading floor position the first spindle is arranged below the second spindle, as seen in the direction of the force of gravity. In this case, the first spindle is arranged in such a way with respect to the second spindle that torque is applied to the lever parts by the force of the weight of the loading floor. This torque is directed in the pivoting direction of the loading floor during the adjustment of the loading floor from the lower loading floor position into the upper loading floor position. As a result, at the start of the adjustment operation the loading floor develops its own dynamics, making it easier for the operator to adjust the height.

According to another preferred exemplary embodiment of the device, there is a device for limiting the pivoting angle of the lever parts, preventing the loading floor from being excessively rotated about the second spindle and, moreover, preferably defining the limit positions of the lever parts when the loading floor is in the upper and/or lower position.

According to another preferred exemplary embodiment of the device, for the pivotably movable bearing of the loading floor on the lever parts there is in each case a bearing journal arranged in a bearing bore. The bearing journals, which are preferably supported resiliently in the direction of the first spindle, are, for example, arranged on the loading floor. As an alternative to the bearing journals, for the purpose of reinforcing the loading floor and/or the lever mechanism and to prevent tilting of the loading floor, it is possible to provide a rigid, continuous transverse strut (bearing spindle), the free ends of which are arranged in the bearing bores. The transverse strut preferably has a circular, in particular round, cross section in order to ensure that the loading floor can be successfully pivoted.

In an advantageous variant embodiment, supporting of the rigid transverse strut on the lever parts is such that manufacturing and/or bearing tolerances in the transverse and longitudinal directions of the vehicle and perpendicular to the vehicle longitudinal axis are compensated for. For this purpose, the rigid transverse strut is supported by means of a radial bearing arrangement at one end and by means of an axial bearing arrangement (e.g. a ball bearing) at its other end.

In a further exemplary embodiment of the device, the loading floor can be fixed in the lower loading floor position and the upper loading floor position by means of a locking device. The locking device can be actuated, for example, by the operator gripping a grip hollow provided in the loading floor. Other variant embodiments are possible.

Finally, another preferred exemplary embodiment of the device is distinguished by the fact that at least one of the lever parts is subject to spring force (Arrow $F_S$ in FIG. 1) in order to overcome a dead center position of the lever parts. The at least one spring element presses or pulls the lever parts out of the dead center position, in which self-locking of the lever mechanism may occur. This improves the ease of adjustment of the loading floor further. The dead center position of the lever parts is dependent on the size of the operator and the resulting setting angle of the loading floor with respect to the horizontal. The dead center position is not usually restricted to a very specific position of the loading floor, but rather extends over an angle range. As an alternative or in addition, with the aid of the at least one spring element 30 (shown schematically in FIG. 1), at least one of the lever parts can be pulled or pressed out of an undefined position located between the lower loading floor position and the upper loading floor position into a predetermined limit position, preferably the lower limit position.

BRIEF DESCRIPTION OF THE DRAWINGS

The invention is explained in more detail below with reference to the drawing.

DETAILED DESCRIPTION OF THE DRAWINGS

Figure 1:
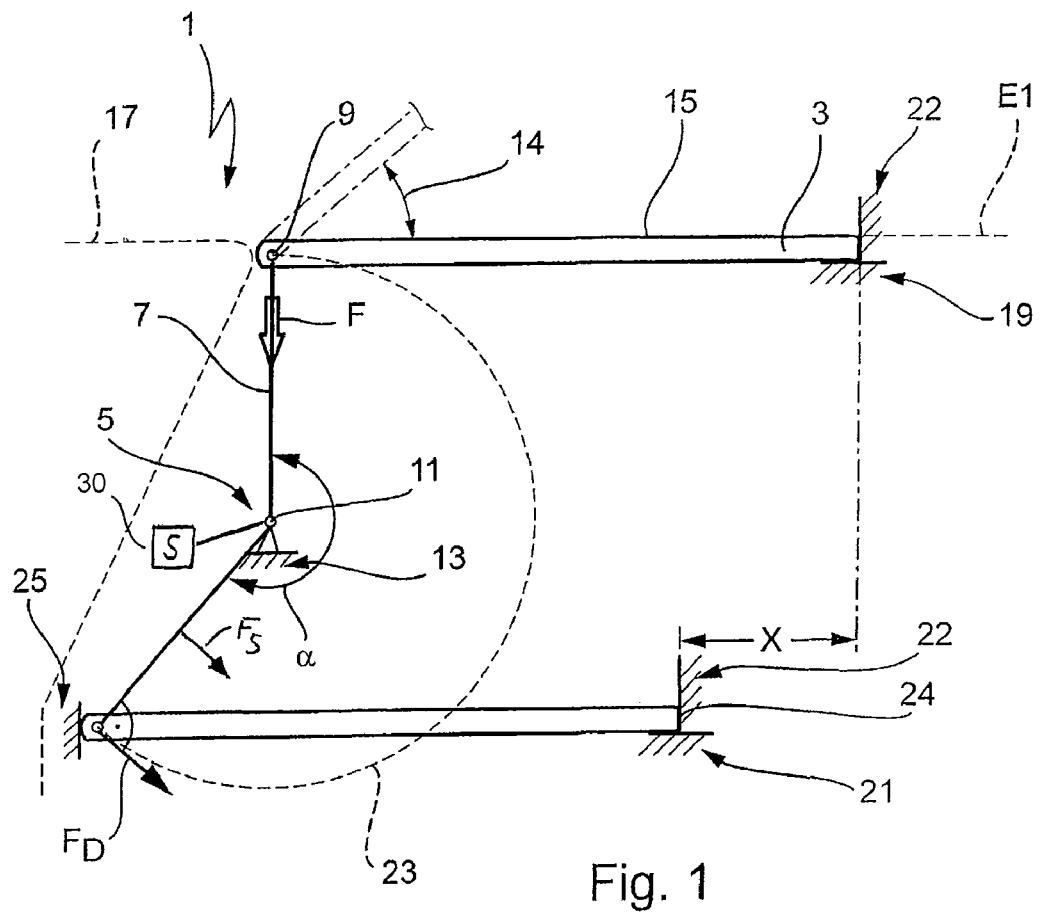
FIG. 1 shows an outline sketch of an exemplary embodiment of the device according to the invention.

FIG. 1 shows an outline sketch of an exemplary embodiment of a device 1 for guiding a loading floor 3 which is in the form of a panel or a roller shutter in a motor vehicle (not shown). The height of the loading floor 3, which is usually arranged in the luggage compartment, can be adjusted relative to the vehicle floor. This allows level equalization when the backrest (not shown) of the back seat is folded down, so that the overall result is a flat loading surface, formed from the loading floor surface and the rear side of the folded-down backrest.

Bearing locations, of which only the bearing location 5 is illustrated in FIG. 1, are arranged laterally opposite one another in the luggage compartment for the purpose of guiding the loading floor 3. In this exemplary embodiment, it is assumed that the bearing locations are identical in form, and consequently the structure and function thereof is explained in more detail below on the basis of the bearing location 5.

Figure 4:
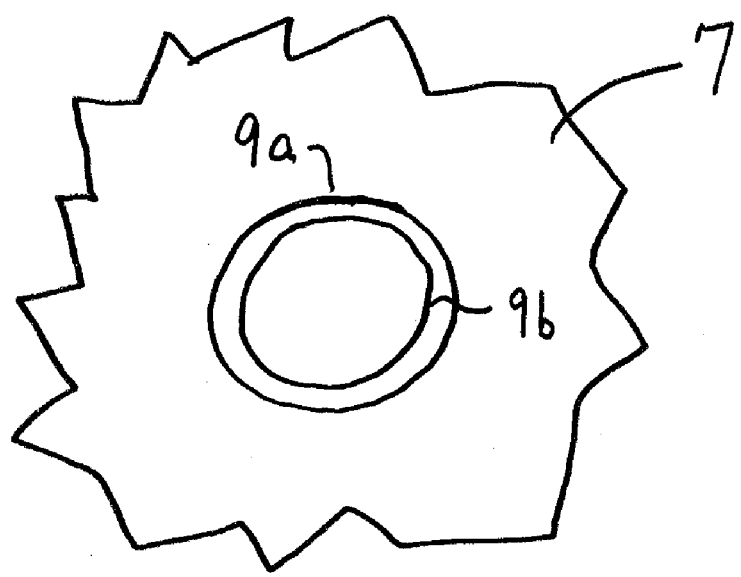
FIG. 4 is a schematic depiction of a bearing bore and bearing journal.

The loading floor 3 is mounted on lever parts 7 such that it can pivot about a first spindle 9 running perpendicular to the plane of the drawing in FIG. 1. For this purpose, the lever parts 7 each have a bearing bore 9a in which bearing journals 9b connected to the loading floor 3 are arranged (as shown schematically in FIG. 4). For their part, the lever parts 7 are mounted such that they can pivot about a second spindle 11. The second spindle 11, which runs perpendicular to the plane of the drawing in FIG. 1 and parallel or substantially parallel to the first spindle 9, is in a fixed position with respect to the vehicle bodyshell 13, which is only indicated in the drawing. The pivotable bearing arrangement for the lever parts 7 may in this case be designed, for example, as a pin/hole connection, and the same also applies to the bearing arrangement for the loading floor 3 at the lever parts 7. It should also be noted that in this exemplary embodiment the loading floor 3 is supported only at the bearing locations described above. In other words, during its adjustment between the upper position and the lower position, the loading floor 3 is displaced exclusively in rotation, whereas in known devices, by contrast, the loading floor is displaced in translation in order for the height to be adjusted. The pivotability of the loading floor 3 about the first spindle 9 serves, inter alia, to allow it to be placed in an enclosed position with respect to an imaginary horizontal, as indicated by a double arrow 14 in FIG. 1, which improves the comfort of operation.

FIG. 1 illustrates the loading floor 3 in two positions. The first position is an upper position (position of use), in which its upper flat side 15 is in the same imaginary plane E1 as the top side of a cover 17, which is arranged between the back seat and the loading floor 3 and is only illustrated by dashed lines, and as the top side of the rear side of the backrest (not illustrated), which is folded down. The second position is a lower position (out-of-use position), in which the flat side 15 of the loading floor 3 is located below the backrest. The loading floor 3 is preferably oriented substantially horizontally in the position of use and the out-of-use position.

In the upper position, the loading floor 3 rests freely, on its opposite side from the first spindle 9, on a first supporting surface 19, which is in a fixed position on the bodyshell side and supports the loading floor 3 from below. Furthermore, below this there is a second supporting surface 21, which supports the loading floor 3 in its lower position. To prevent the loading floor 3, when supported on the supporting surface 19 or 21, from moving to the right—in accordance with the illustration shown in FIG. 1—there is in each case a stop 22, which is only indicated in the figure and may be formed, for example, by a loading edge of the vehicle body. A device 25, which will be dealt with in more detail below, prevents the loading floor 3 supported on the supporting surface 19 or 21 from slipping to the left, in accordance with the illustration shown in FIG. 1.

On account of the constant distance between the first and second spindles 9, 11, the loading floor 3, during its adjustment between the lower position and the upper position, executes a partial circular movement, as indicated by dashed line 23. The pivot angle range $\alpha$ is in this case approximately 220°; in another exemplary embodiment (not illustrated) it may, of course, also be larger or smaller.

It can be seen from FIG. 1 that when the loading floor 3 has been pivoted into the upper position the first spindle 9 is arranged above the second spindle 11 and the lever parts 7 run parallel to an imaginary vertical, so that the force of the weight of the loading floor 3 and also that of any objects which have been placed onto its flat side 15 are introduced into the center of the bearing location 5, through which the second spindle 11 passes, as indicated by an arrow F. As soon as the loading floor 3 is pivoted a few degrees clockwise toward its lower position, the force of its weight leads to a torque being applied to the lever parts 7, thereby making it easier for the operator to pivot the loading floor 3.

In the lower loading floor position, the first spindle 9 is arranged below and to the left of the second spindle 11, so that the lever parts 7 are subjected, by the weight of the loading floor 3, to a force $F_D$ which leads to automatic pivoting of the lever parts 7 in the counterclockwise direction. In this case too, the force of the weight of the loading floor 3 is used to displace the loading floor in order to make it easier for an operator to adjust the height of the loading floor 3.

It can also be seen from FIG. 1 that the front edge 24 of the loading floor 3, in the lower position, has been offset backward by a distance X in the direction of the second spindle 11, i.e. the front edge 24 is not at the same level as in the upper position. The distance X is determined by the pivot angle range of the lever parts 7 and their arrangement when the loading floor 3 is arranged in the upper and lower positions, and is therefore adjustable.

The device 25, which is in this case formed by a stop, is provided in order to limit the pivot angle range of the lever parts 7, to ensure that they are not excessively rotated, and/or in order to define the lower and/or upper loading floor position. The loading floor 3 comes to bear against the stop when it is being adjusted into the lower position. The device 25 may, for example, also be configured such that at least one of the lever parts 7 is displaced onto a stop.

To summarize, it remains to be noted that the loading floor 3 is articulatedly mounted only at the bearing locations 5 and can therefore be pivoted between the upper and lower positions independently of, for example, the position of the rear seat backrest or other interior parts of the motor vehicle. Since the loading floor 3 is only moved in rotation, it is possible to realize a simple and inexpensive structure of the device 1.

Figure 2:
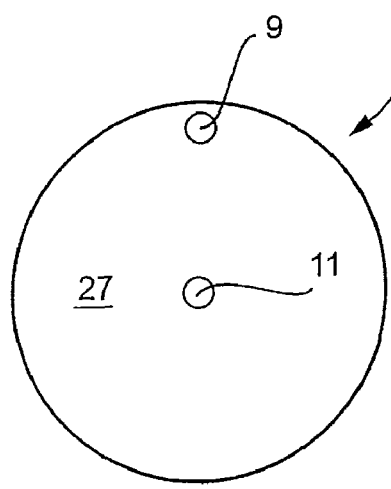
FIG. 2 shows a plan view of a first exemplary embodiment of a lever part for bearing a loading floor.

FIG. 2 shows an exemplary embodiment of one of the lever parts 7, which is designed as a rotary disk 27, i.e. the lever part 7 is in disk form and is in this case circular. The first spindle 9, about which the loading floor 3 can be pivoted relative to the lever parts 7, is located at a radial distance from the second spindle 11 about which the lever parts 7 can be pivoted.

Figure 3:
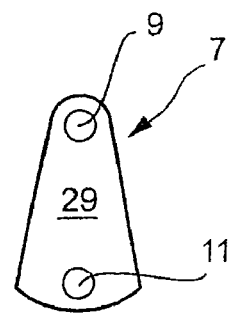
FIG. 3 shows a plan view of a second exemplary embodiment of the lever part.

FIG. 3 shows a further exemplary embodiment of one of the lever parts 7, which is designed as a pivot lever 29. This requires a smaller installation space than the rotary disk. Moreover, it has a smaller volume and therefore a lower weight if the same material is used.

Identical lever parts 7 may be provided on both sides of the loading floor 3. It is also possible, for example, for a rotary disk to be provided as lever part 7 on one side of the loading floor 3 and for a pivot lever to be provided on the other side.

In the exemplary embodiment of the device 1 which has been described with reference to the figures, the loading floor 3 can only be pivoted into two different height positions. It is also readily possible for the device 1 to be designed in such a way that it allows the loading floor 3 also to be adjusted into more than two positions.

The invention claimed is:

1. A device for guiding a loading floor of a motor vehicle, the height of which floor can be adjusted manually, the device comprising:
   a first spindle, about which the loading floor can pivot;
   a second spindle; and
   lever parts, which are arranged opposite one another and can be pivoted about the second spindle and on which the loading floor is pivotably mounted via the first spindle; wherein
   said spindles and lever parts are configured such that the loading floor can be adjusted between a lower loading floor position and an upper loading floor position by a pivoting movement of the lever parts; and
   in the lower loading floor position the first spindle is arranged below the second spindle, relative to the direction of the force of gravity, and is offset laterally with respect to the second spindle in such a way that a torque applied to the lever parts by weight of the loading floor acting on them is directed in a pivoting direction of the loading floor when it is being moved from the lower loading floor position into the upper loading floor position.

2. The device as claimed in claim 1, wherein the first and second spindles run parallel to one another.

3. The device as claimed in claim 2, wherein the second spindle is arranged in a fixed position with respect to the body shell of the motor vehicle.

4. The device as claimed in claim 1, wherein in the upper loading floor position the first spindle is arranged above the second spindle, relative to the direction of the force of gravity.

5. The device as claimed in claim 4, wherein in the upper loading floor position the first spindle is arranged in such a way with respect to the second spindle that resulting forces which are transmitted via the loading floor to the lever parts are oriented substantially in the direction of a bearing center of the lever parts.

6. The device as claimed in claim 1, further comprising a device for limiting a pivoting angle of the lever parts.

7. The device as claimed in claim 1, wherein for the pivotably movable bearing of the loading floor on the lever parts, there is in each case a bearing journal arranged in a bearing bore.

8. The device as claimed in claim 1, wherein the loading floor is supported in the lower loading floor position and the upper loading floor position.

9. The device as claimed in claim 8, wherein at least one of the lever parts is subject to a spring force in order to overcome a dead center position of the lever parts and/or to displace the lever parts into a limit position.

10. The device as claimed in claim 1, wherein the loading floor is supported on one side.

11. The device as claimed in claim 1, wherein the lever parts are designed as one of rotary disks and pivot levers.

12. The device as claimed in claim 1, wherein the second spindle is arranged in a fixed position with respect to the body shell of the motor vehicle.

13. The device as claimed in claim 1, wherein at least one of the lever parts is subject to a spring force in order to overcome a dead center position of the lever parts and/or to displace the lever parts into a limit position.

* * * * *